June 28, 1960 C. E. CLARK 2,942,397
POWER-DRIVEN, GRASS-CUTTING AND GRASS-RENOVATING MACHINE
Filed Sept. 15, 1958 3 Sheets-Sheet 1
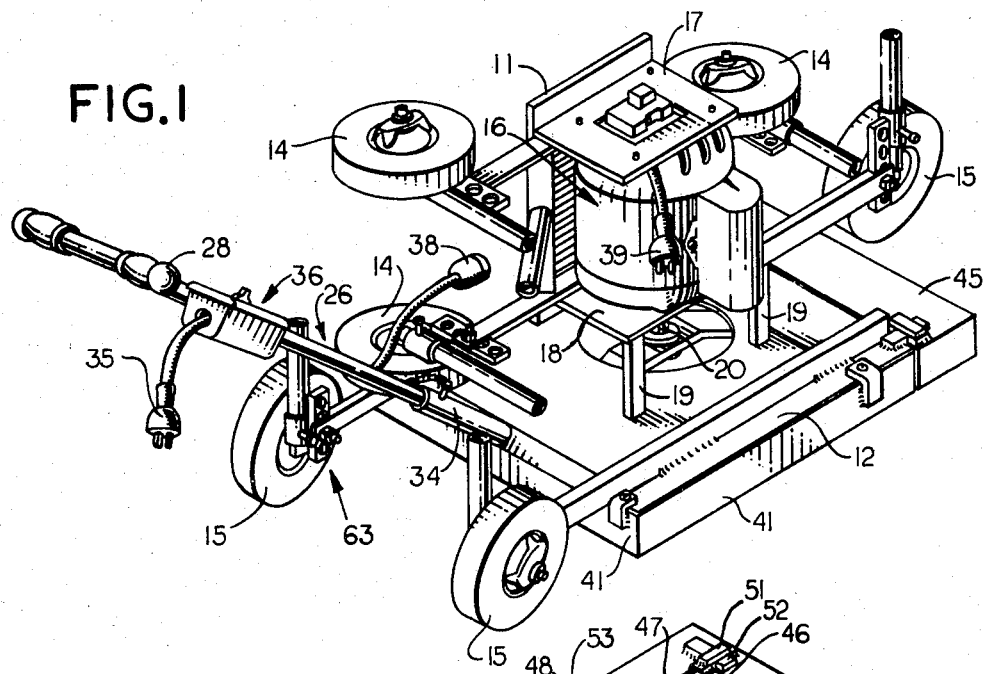
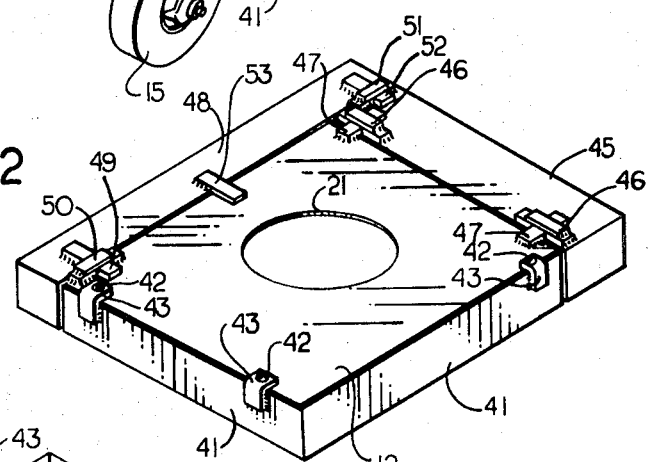
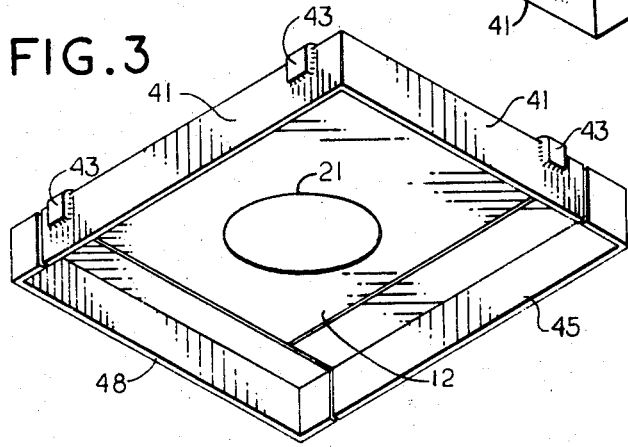
INVENTOR.
CHARLEY E. CLARK

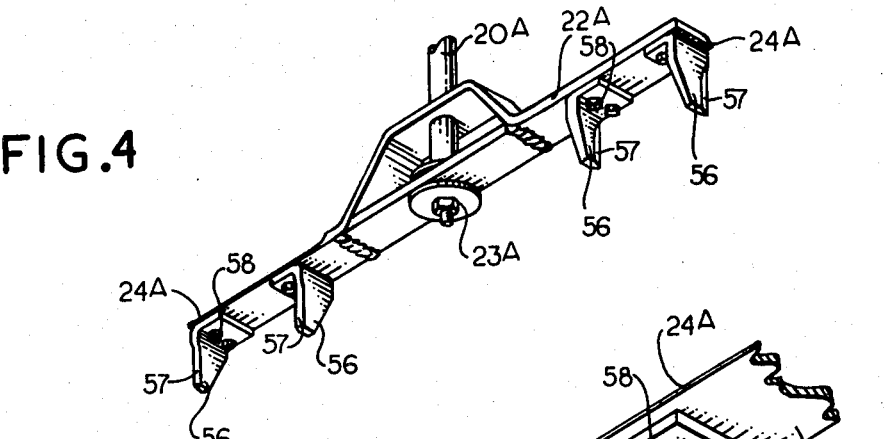
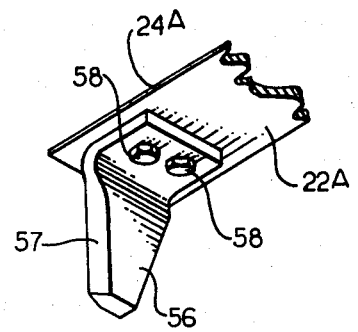
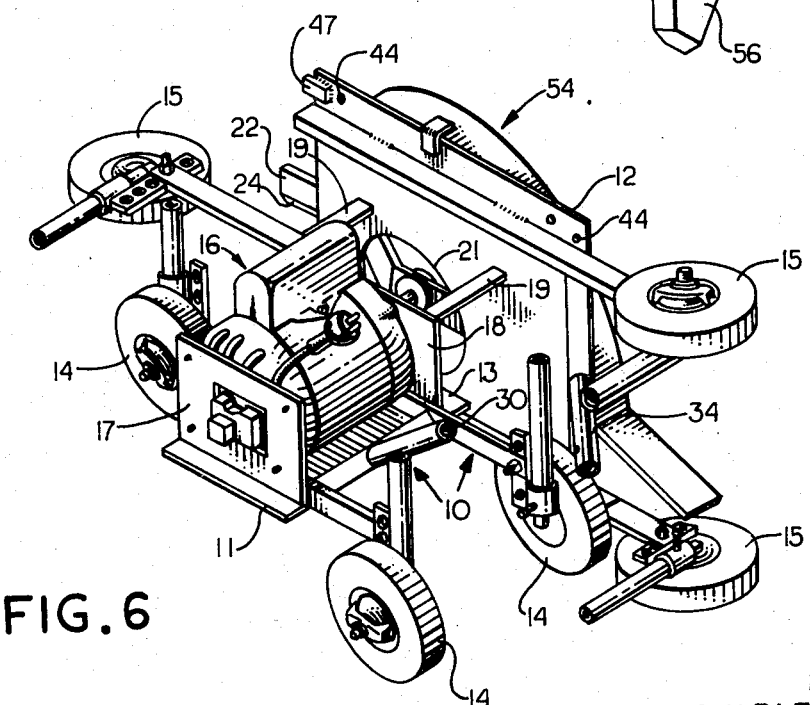

June 28, 1960 C. E. CLARK 2,942,397
POWER-DRIVEN, GRASS-CUTTING AND GRASS-RENOVATING MACHINE
Filed Sept. 15, 1958 3 Sheets-Sheet 3
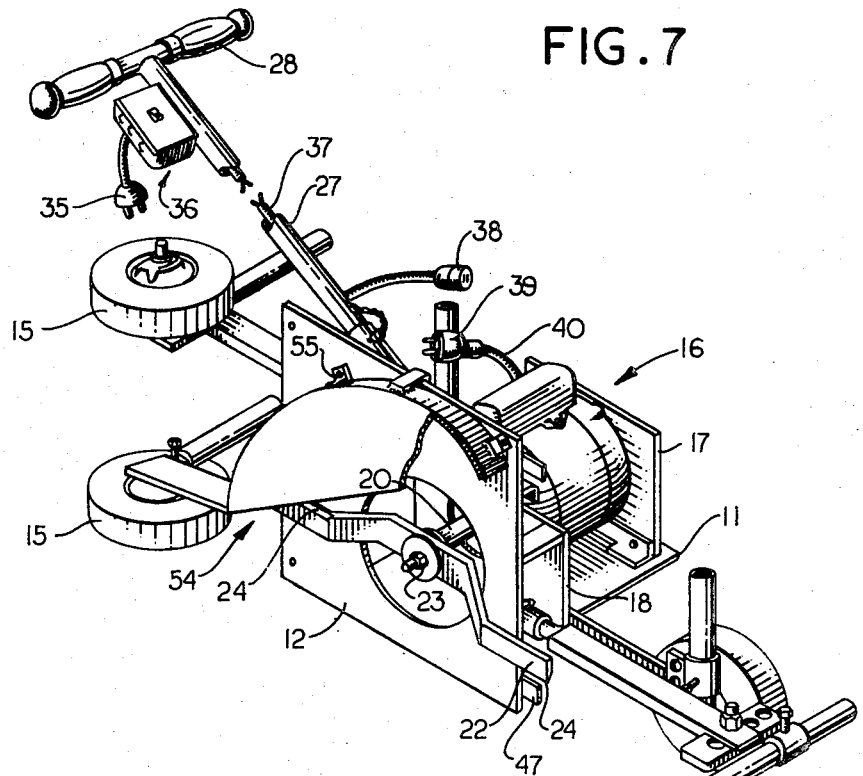
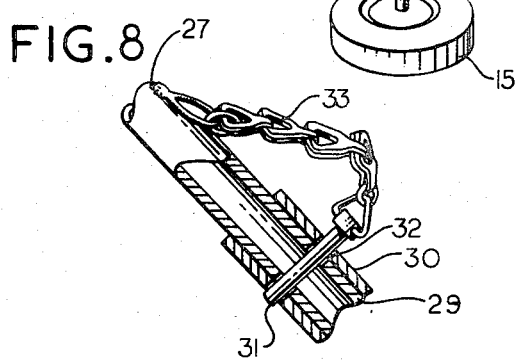
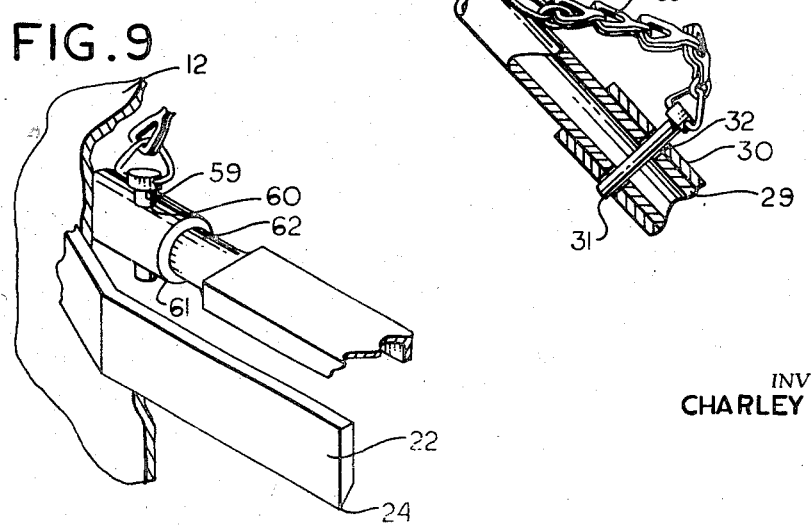
INVENTOR.
CHARLEY E. CLARK

United States Patent Office 2,942,397
Patented June 28, 1960

2,942,397

POWER-DRIVEN, GRASS-CUTTING AND GRASS-RENOVATING MACHINE

Charley E. Clark, 632 W. Queen St., Inglewood, Calif.

Filed Sept. 15, 1958, Ser. No. 761,055

1 Claim. (Cl. 56—25.4)

Generally speaking, the present invention relates to the grass-cutting and grass-edging art and, more particularly, pertains to an improved power-driven machine capable of use for normal grass-cutting operations whereby to cut off the grass comprising a lawn at a substantially uniform height, capable of a special type of grass-cutting use comprising edging the grass or turf so as to provide a clean sharp edge therealong, and capable of an additional grass-cutting use comprising what is known in the art as grass-renovating and sometimes referred to as power raking, or the like, wherein a lawn has a substantial amount of intergrown, intermingled Bermuda Grass tendrils or roots cut and/or forcibly removed, after which a reseeding and fertilizing operation is customarily performed, subsequently resulting in a new growth of grass as a result thereof.

I am aware of the fact that various types of power mowers of both the so-called reel type and the so-called rotary blade type have been developed heretofore. I am also aware of the fact that various power-driven lawn edgers have been developed heretofore. And I am further aware of the fact that various types of power lawn renovating machines and power lawn raking machines have been developed heretofore. However, I am not aware of any prior art power-driven lawnmower, which can also be employed as a power-driven edger and/or a power-driven lawn renovator. Therefore, I have invented such a composite, universally usable machine for these multiple purposes and comprising a relatively simple foolproof construction peculiarly well adapted for the purposes outlined above.

With the above point in mind, it is an object of the present invention to provide an improved power-driven, wheeled, controllably manually propelled, grass-cutting machine which is capable of assuming two different, substantially mutually perpendicular positions; one of said positions comprising a normal grass-cutting position with a rotary blade means driven by motor means positioned for rotation in a substantially horizontal plane above an underlying ground surface along which one set of supporting wheel means is adapted to rollably transport the machine; and another of said positions comprising a normal grass-edging position substantially perpendicular to said grass-cutting position and with said rotary blade means positioned for rotation in a substantially vertical plane with respect to the underlying ground surface and with another set of supporting wheel means positioning the entire machine for transport along an underlying surface adjacent a lawn edge.

It is a further object of the present invention to provide a power-driven machine of the character set forth in the preceding object, wherein a rotary cutting blade means may be controllably replaced with rotary renovating tiller blade means adapted, when said blade means is in the normal horizontal grass-cutting position, to downwardly penetrate a lawn which is to be power renovated whereby said tiller blade means will effectively power renovate or power rake said lawn.

It is a further object of the present invention to provide an improved power-driven machine of the type set forth in either of the preceding objects, which includes carriage means which effectively carries the motor means, the rotary blade means, and the two sets of mutually perpendicular supporting wheel means enabling said carriage means to be controllably positioned in either of said mutually perpendicular grass-cutting positions and grass-edging positions.

It is a further object of the present invention to provide a longitudinal propelling handle which is controllably removably and interchangeably engageable, in a grass-edging position, with respect to said carriage means when said carriage means is in the grass-edging position, and which is also adapted to be controllably removably and interchangeably engageable, in a grass-cutting position, with respect to said carriage means when said carriage means is in said grass-cutting position; in each case said longitudinal propelling handle being upwardly rearwardly angularly directed into a position for convenient manual grasping by the hands of a person controlling and directing the machine during either a grass-cutting operation, a grass-edging position, or a power-renovating operation when in the grass-cutting position with the rotary blade means replaced by the rotary tiller blade means.

It is a further object of the present invention to provide a power-driven machine of the character set forth in any of the preceding objects including removable guard means engaged with the carriage means in protective relationship with respect to the plane of rotation of the rotary blade means.

It is a further object of the present invention to provide an improved power-driven machine of the type set forth in the preceding object, wherein the removable guard means includes individually removable portions allowing the grass-cutting machine to engage in grass-cutting operations close to an obstruction by propelling the machine in the direction of a removed portion of said guard means, or in a manner such as to allow the rotary blade means to approach closer to a desired region than would normally be allowed by the removed portion of said guard means prior to removal thereof.

Other and allied objects will be apparent to those skilled in the art after a careful study of the accompanying illustrations, the present specification, and the appended claim.

To facilitate understanding, reference will be made to the hereinbelow-described drawings, in which:

Fig. 1 is an isometric view of one illustrative embodiment of the present invention in grass-cutting position;

Fig. 2 is an isometric view, somewhat similar to Fig. 1, showing a portion of the carriage means with all of the removable guard means engaged therewith and with all other portions of the machine removed for clarity;

Fig. 3 is an isometric view as seen from a vantage point below the structure shown in Fig. 2;

Fig. 4 is a fragmentary isometric view taken from a vantage point beneath a modified form of the rotary blade means comprising rotary tiller blade means for use in power renovating a lawn;

Fig. 5 is an enlarged fragmentary view of the left end of the rotary tiller blade means illustrated in Fig. 4;

Fig. 6 is an isometric view, with the handle removed, of the complete power-driven machine shown in Fig. 1 repositioned in the grass-edging position;

Fig. 7 is another isometric view, seen from the opposite side of the machine illustrated in Fig. 6, with a portion of the grass-edging guard broken away and in section to better illustrate the structure thereof, and showing the longitudinal propelling handle in the grass-edging position with respect to the carriage means;

Fig. 8 is an enlarged fragmentary view, partly in vertical section, illustrating the means for fastening the longitudinal propelling handle in the grass-edging position; said means also being employed, when the apparatus is in the grass-cutting position shown in Fig. 1, for fastening the handle in said position; and Fig. 9 is an enlarged fragmentary, partially broken away, isometric view illustrating the removable attachment of the forward wheel of the supporting wheel means normally contacting the ground when the machine is in the grass-cutting position illustrated in Fig. 1 and which is not used when the machine is in the grass-edging position shown in Figs. 6 and 7.

The machine of the present invention includes carriage means provided with first supporting wheel means and second supporting wheel means mutually perpendicular to said first supporting wheel means, thus providing a first grass-edging supported position of the carriage means and a second mutually perpendicular grass-cutting position of the carriage means. In the specific embodiment of the invention illustrated, said carriage means is indicated generally at 10, as best seen in Fig. 6, and is of substantially L-shaped form including a first platform 11 and a second mutually perpendicular platform 12 which are fastened together by welding or other suitable fastening means at the junction indicated at 13. In the specific example illustrated, the first supporting wheel means referred to above comprises three wheels 14 effectively carried by the first platform 11 for rollable engagement with an underlying supporting surface (not shown) when the machine is to be used as a grass edger and is in the grass-edging position shown in Figs. 6 and 7.

In the specific example illustrated, the second supporting wheel means referred to above comprises three wheels 15 effectively carried by the second platform 12 for rollable engagement with an underlying supporting surface (not shown) when the machine is to be used as a grass cutter (or a lawn power renovator) and is in the grass-cutting position shown in Fig. 1.

It should be noted that when the machine is in the grass-edging position shown in Figs. 6 and 7, the second set of supporting wheels indicated at 15 are completely out of contact with an underlying supporting surface, while when the machine is in the grass-cutting (or grass-renovating) position shown in Fig. 1, the first supporting wheels indicated at 14 are completely out of contact with an underlying supporting surface.

The present invention also includes motor means carried by the carriage means and rotary blade means coupled to the motor means for rotation about an axis parallel to the axis of rotation of the first wheel means supporting the carriage means in the grass-edging position. In the specific embodiment of the invention illustrated, said motor means comprises an electric motor, indicated generally at 16, which is effectively mounted with respect to the carriage means, indicated generally at 10, by two end plates 17 and 18 suitably fastened to the first platform 11 and suitably braced by brace means 19 fastened between the end plate 18 and the second platform 12. It will be noted that the electric motor 16 is mounted in a manner such that the output shaft 20 is parallel to the first platform 11 and to the axes of rotation of the first supporting wheels 14, and that said output shaft extends from the motor 16 through an aperture 21 in the second platform 12 to a position on the other side of said second platform 12 from the motor means 16, where the rotary blade means 22 is removably attached by suitable fastening means 23. It will be noted that the rotary blade means has two sharpened edges indicated at 24, which are oppositely directed in the direction of rotation of the output shaft 20 whereby to provide effective cutting action upon energization of the motor 16 in either the grass-edging position shown in Figs. 6 and 7 or the grass-cutting (and/or grass-renovating) position shown in Fig. 1.

The present invention also includes a longitudinal propelling handle which is controllably removably and interchangeably engageable with respect to the first platform in a first upwardly rearwardly angularly directed grass-edging position when said first platform is horizontal, and in a second upwardly rearwardly angularly inclined grass-cutting position with respect to said second platform when said second platform is horizontal. In the specific example illustrated, said longitudinal propelling handle is indicated generally at 26 and comprises a longitudinal hollow tubular portion 27 having a T-shaped manually graspable cross bar 28 at the top thereof and having an insertion end 29 at the bottom thereof adapted to be inserted into a hollow tubular receiver 30 when the machine is in the grass-edging position shown in Figs. 6 and 7, where it is adapted to be retained by a locking pin 31 inserted through aligned apertures indicated at 32 in the receiver 30 and the insertion end 29 of the handle 26; the locking pin 31 being retained so as to prevent loss thereof by fastening same by means of a fastening chain 33 to the longitudinal tubular portion 27 of the handle 26. It will be noted that the insertion end 29 of the handle 26 is adapted to be inserted in another tubular receiver 34 and to be similarly retained therein by the insertion of the locking pin 31 through aligned apertures (similar to those shown at 32 in Fig. 8) when the entier machine is in the grass-cutting position shown in Fig. 1.

The removable handle means 26 is provided with electric circuit means including, in the specific example illustrated, an electrical connector plug 35 which is adapted to be connected to a suitable source of electric energy (not shown), manually controllable switch means indicated generally at 36 which is physically carried by the upper end of the tubular portion 27 of the handle 26, a length of double wire 37 extending downwardly through the hollow interior of the tubular portion 27 of the handle 26, a female electrical connector 38 carried by the lower end of the wire 37, a coperating male connector 39 connected by a double wire 40 to the electric motor 16. The arrangement is such that the female and male connectors 38 and 39 may be separated when it is desired to move the handle from the grass-edging position shown in Fig. 7 to the grass-cutting (or grass-renovating) position shown in Fig. 1; it being understood that said connectors 38 and 39 will be reengaged after such repositioning of the handle 26, so that the motor 16 will be ready for energization by the manual operation of the switch 36.

The present invention also includes removable guard means engaged with the carriage means in protective relationship with respect to the plane of rotation of the rotary blade means; said removable guard means including individually removable portions allowing the grass-cutting machine to engage in grass-cutting operations close to an obstruction by selective removal of certain portions of said removable guard means. In the specific example illustrated, said removable guard means are best seen in Figs. 2 and 3 and comprise a substantially L-shaped member 41 fastened with respect to two edges of the second platform 12 by threaded fastening means 42 extending through brackets 43 which are welded to the member 41; said screws extending through the brackets 43 into aligned tapped holes 44 in the second platform 12. It will be noted that this L-shaped portion 41 of the removable guard means can be removed by merely unscrewing the screws 42. The removable guard means also includes a front portion 45 which has a slotted receiver 46 adjacent each end thereof adapted to receive and slip over corresponding forwardly projecting fingers 47 carried by the second platform 12, whereby the front portion 45 of the removable guard means may be readily controllably removed when desired. Said removable guard means also includes a left portion 48 having a rightwardly projecting finger 49 adapted to be removably received in an apertured receiver 50 carried by the rear of the second platform 12. Said left portion 48 of the removable guard means also includes a rightwardly projecting finger 52 adapted to be removably received in a laterally apertured receiver 51 carried by the front portion 45 of the removable guard means. Said left portion 48 also carries a rightwardly projecting finger 53 adapted to rest upon the second platform 12. The arrangement is such that the entire left portion 48 of the removable guard means may be easily and conveniently removed, thus allowing the rotary blade means 22, when the machine is in the grass-cutting position shown in Fig. 1, to readily move very closely adjacent to obstacles and other obstructions so as to allow the grass to be cut very close thereto. Furthermore, it should be noted that the front portion 45 may similarly be removed for similar purposes. In this connection, it should be noted that the removal of either the left portion 48 or the front portion 45 of the removable guard means will not necessitate removal of the other L-shaped portion 41 of the removable guard means, which act to protect the feet of a user of the device who is positioned behind the second platform 12 while propelling the machine. Thus, safety is provided during periods when a portion of the removable guard means is removed to facilitate cutting a lawn close to an obstacle or obstruction.

It should also be noted that when the machine is in the grass-edging position illustrated in Figs. 6 and 7, a partially arcuate guard indicated generally at 54 is adapted to be fastened above the rotary blade 22 by screw means 55 engaging tapped holes in the second platform 12, whereby grass and other debris will be prevented from being thrown upwardly toward a person grasping the handle 28 and propelling the device. Of course, the guard 54 must be removed when the machine is turned over into the grass-cutting position shown in Fig. 1.

Figs. 4 and 5 illustrate a slight modification of the rotary cutting blade 22 illustrated in the earlier forms of the invention, and similar parts will be indicated by the same reference numerals, followed by the leter "A," however. In this modification, the rotary cutting blade 22A is similar to the rotary cutting blade 22 in the first form of the invention except that it is provided with tiller means comprising projections 56 suitably fastened to the rotary cutting blade 22A and having sharpened edges 57 directed similar to the direction of rotation of blades 22A; it being understood that the tiller projections 57 will extend downwardly into the surface of grass which is to be power-renovated and will power-renovate or power-rake same in a manner which requires no further explanation in the light of the description set forth hereinbefore.

It should be noted that the tiller projections 57 are fastened onto the rotary blade 22A by suitable threaded fastening means 58 so that they may be replaced when they become worn through use.

Fig. 9 merely illustrates a structure whereby the front one of the second set of wheels 15 may be conveniently removed by removing a fastening pin 59 from aligned apertures 60 in a tubular member 61 and in a round structural meber 62 carrying the forward wheel 15. This is provided in view of the fact that the forward wheel 15 extends to a very substantial distance in front of the machine and it may be desirable to remove same when the machine is in the grass-edging position shown in Figs. 6 and 7.

It should also be noted that all of the wheels are vertically adjustable by means of tube and sleeve controllably lockable mounting structures and by reason of multi-apertured mounting bracket carried by the supporting structure. One such vertically adjustable wheel mounting structure is indicated generally by the reference numeral 63 in Fig. 1. However, it should be understood that all of the other wheel supporting structures are similarly vertically adjustable.

Numerous modifications and variations of the present invention will occur to those skilled in the art after a careful study hereof. All such, properly within the basic spirit and scope of the present invention are intended to be included and comprehended herein as fully as if specifically described, illustrated, and claimed herein.

The exact compositions, configurations, constructions, relative positionings, and cooperative relationships of the various component parts of the present invention are not critical, and can be modified substantially within the spirit of the present invention.

The embodiments of the present invention specifically described and illustrated herein are exemplary only, and are not intended to limit the scope of the present invention, which is to be interpreted in the light of the prior art and the appended claim only, with due consideration for the doctrine of equivalents.

I claim:

A power-driven wheeled controllably manually propelled grass-cutting machine, comprising: substantially L-shaped carriage means provided with a first platform and a second mutually perpendicular platform, said carriage means being provided with supporting wheel means positioned for contact with an underlying substantially horizontal supporting surface with the carriage means in a first grass-edging supported position with said first platform parallel to and spaced above the supporting surface and with said second platform perpendicular to the supporting surface, and with said wheel means also being positioned for contact with the underlying substantially horizontal supporting surface with the carriage means in a second grass-cutting supported position with said second platform parallel to and spaced above the supporting surface and with said first platform perpendicular to the supporting surface; electric motor means carried by said carriage means and having an output shaft parallel to said first platform; rotary blade means centrally coupled to said output shaft and substantially perpendicular thereto and positioned on the other side of said second patform from said motor means; a longitudinal propelling handle; handle engaging means carried by said carriage means and removably engageable with said longitudinal propelling handle in a first grass-edging manner positioning said carriage means in said first grass-edging supported position, and removably engageable with said longitudinal propelling handle in a second grass-cutting manner positioning said carriage means in said second grass-cutting supported position, said removable handle means being provided with electric circuit means including manually controllable switch means therein, said electric circuit means being removably connectable at the top with respect to a source of electric energy and being removably connectable at the bottom to said electric motor; and removable guard means engaged along four rectangularly interconnected edges of said second platform and including edge flange means downwardly directed when said carriage means is in said second grass-cutting supported position extending into protective relationship around exposed portions of the plane of rotation of said rotary blade means, and with said removable guard means including individually removable straight portions along at least the front and one side of said second platform and each including a portion comprising a part of said second platform and extending from the edge flange thereof toward said output shaft whereby removal thereof will effectively remove an edge strip of said second platform in addition to the protective corresponding edge flange thereby allowing the rotary blade means to extend beyond the remaining corresponding edge of said second platform during rotation of said blade means, allowing the grass-cutting machine to engage in grass-cutting operations close to an obstruction at the front and at said side by propelling the machine in the direction of an individually removed portion of said guard means.

References Cited in the file of this patent

UNITED STATES PATENTS

| | | |
|---|---|---|
| 1,601,859 | Johnson | Oct. 5, 1926 |
| 2,514,407 | May | July 11, 1950 |
| 2,523,640 | Zipf | Sept. 26, 1950 |
| 2,612,741 | McKay | Oct. 7, 1952 |
| 2,719,397 | Pritchard | Oct. 4, 1955 |
| 2,795,916 | Miller | June 18, 1957 |